(No Model.) 2 Sheets—Sheet 1.
C. H. GRAY.
MACHINE FOR MANUFACTURING MACHINE BELTING.
No. 575,424. Patented Jan. 19, 1897.
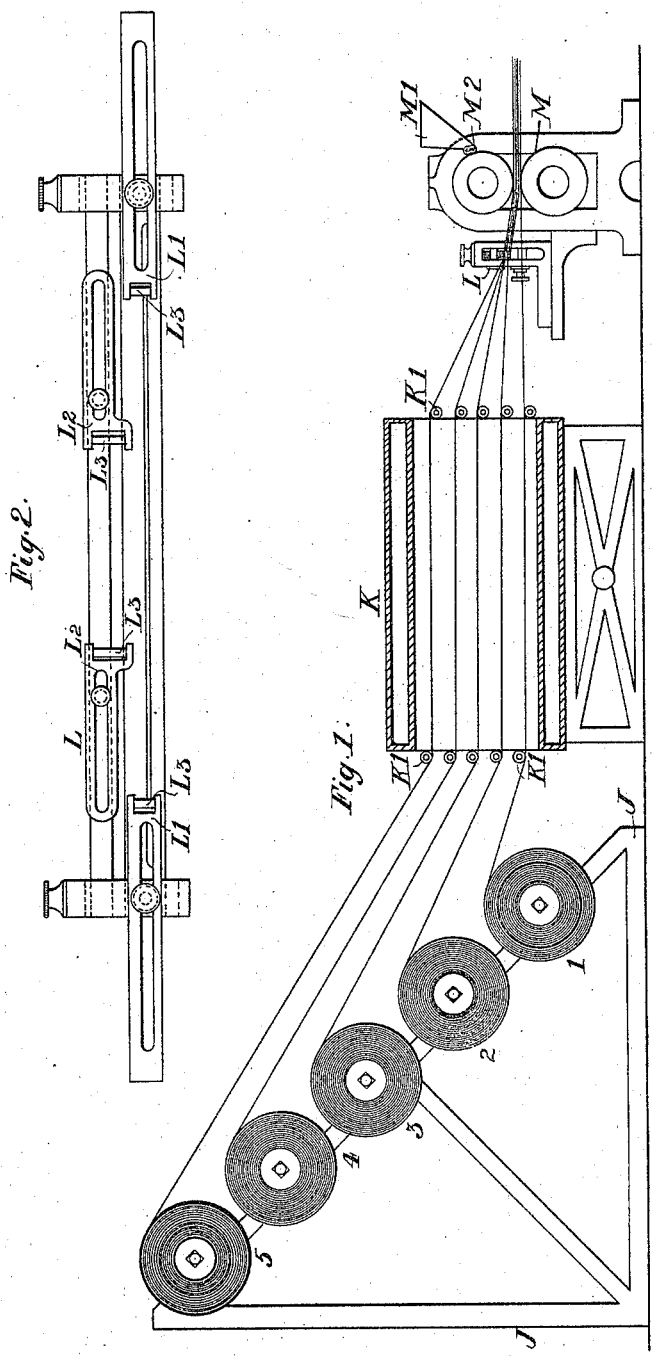

(No Model.) 2 Sheets—Sheet 2.
C. H. GRAY.
MACHINE FOR MANUFACTURING MACHINE BELTING.
No. 575,424. Patented Jan. 19, 1897.
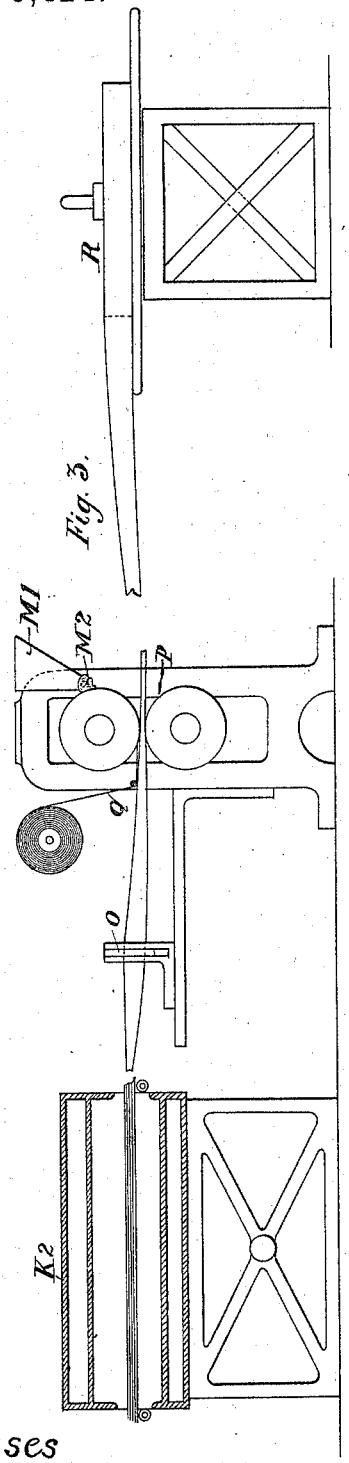
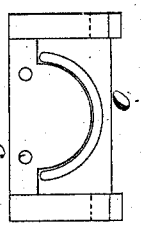
Witnesses
Inventor
Christian Hamilton Gray
by Foster & Freeman
Attys

UNITED STATES PATENT OFFICE.

CHRISTIAN HAMILTON GRAY, OF SILVERTOWN, ENGLAND.

MACHINE FOR MANUFACTURING MACHINE-BELTING.

SPECIFICATION forming part of Letters Patent No. 575,424, dated January 19, 1897.

Application filed July 11, 1896. Serial No. 598,864. (No model.) Patented in England February 1, 1896, No. 2,353.

*To all whom it may concern:*

Be it known that I, CHRISTIAN HAMILTON GRAY, a subject of the Queen of England, residing at Silvertown, Essex, England, have invented certain new and useful Improvements in Machines for Manufacturing Machine-Belting, (for which I have obtained Letters Patent in Great Britain, No. 2,353, dated February 1, 1896,) of which the following is a specification.

The object of my invention is to provide an improved mechanism for manufacturing coated-fabric belting of any desired number of plies; and it consists in the construction and combination of the several parts of the mechanism for assembling the strips of fabric and pressing them together, as will be fully set forth in the following specification, and particularly pointed out in the claim.

In the accompanying drawings I have represented diagrammatically one form of apparatus for carrying my invention into practice.

In the drawings, Figure 1 is an elevation of the strip-uniting apparatus, a detached portion of which is shown on an enlarged scale in Fig. 2. Fig. 3, which is practically a continuation of Fig. 1, represents the folding and finishing apparatus, a detached portion of which is shown on an enlarged scale in Fig. 4; and Figs. 5 and 6 are sections through a belt constructed in the apparatus shown in the other figures, Fig. 5 representing it as in course of construction and Fig. 6 as when completed.

Like letters and figures indicate like parts throughout the drawings.

The drawings illustrate the manufacture of what is known as "six-ply belting," but it is to be understood that belting of any other number of plies may be constructed in a similar manner.

The coated fabric E, of which the belt is to be composed, is in the form of strips of suitable width wound into rolls. As shown in the drawings, five of these rolls are employed, numbered 1, 2, 3, 4, and 5.

As clearly shown in Fig. 5, the fabric of the roll numbered 1 is rather more than twice the width of that of the other rolls. These rolls are supported on a frame J and the strips therefrom are guided by suitable rollers K' through a steam-jacketed or equivalent heating-chamber K, whereby they are brought into a tacky condition. The strips 1 to 5 then pass through the gage L, hereinafter described, and directly afterward through the doubling-rolls M, which cause all the strips to adhere firmly together in the manner shown in Fig. 5. A trough M' and sponge or equivalent M$^2$ are employed, so as to apply water or equivalent to the surface of one or both of the rolls M to prevent the tacky strips from adhering to them.

The gage L, a front elevation of which is shown on an enlarged scale in Fig. 2, is provided with two pairs L' L$^2$ of adjustable guides, which centralize the wider and narrower strips 1 and 2 to 4, respectively, in relation to each other, the two guides L' retaining the wider strip 1 in position and the two guides L$^2$ retaining the narrower strips 2 to 5 in position. Each of the guides L' L$^2$ carries a roller L$^3$ at its operative end, so as to prevent fraying or tearing of the edges of these strips.

The unfinished belt, when it leaves the rolls M, more or less loses its tackiness, so that it is passed through a heating-chamber K$^2$ in order that it may again be rendered tacky. Immediately after leaving the heating-chamber K$^2$ the belt passes through the die O, Figs. 3 and 4, which turns the projecting edges E$^2$ of the strip 1 over onto the strips 2, 3, 4, and 5, the extreme edges of the strip 1 either meeting or overlapping each other. From the die O the belt passes to the finishing-rolls P, where a strip Q of thin gutta-percha is applied to the joint of the strip 1, so as to overlap it for a suitable distance on each side, as shown in Fig. 6, the general tackiness of the belting insuring the proper adhesion of this strip Q. A trough M' and sponge or equivalent M$^2$ are applied to the rolls P for a similar reason to that before described in connection with the doubling-rolls M. From the rolls P the then finished belting passes to a revolving table or swift R, whereon it is rolled up into a form convenient for transport or sale.

The rolls or other operative parts of the apparatus are rotated by any suitable mechanism at any desired speed, but I prefer to rotate the rolls P quicker than the rolls M, so as to take the "stretch" out of the belting at this stage of the operation.

The heating of the various rolls and chambers may be effected by steam or any other desired medium.

I claim—

In the manufacture of coated-fabric belting for machinery, the combination of a rack supporting a number of rolls of coated fabric of equal width, and an additional roll of coated fabric about double the width of the others, a heated chamber through which the coated fabrics are passed as they are unwound from the rolls, a compound gage receiving and guiding the fabrics of equal width in one part thereof, and the wider fabric in another part, doubling-rolls for uniting all of said fabrics together by adhesion of their surfaces, an additional heated chamber through which the united fabrics are passed, a die for turning the edges of the wider fabric around the edges of the narrower ones, and a pair of finishing-rolls for applying a strip of material to the meeting edges of said wider fabric, substantially as described.

In testimony whereof I have hereto affixed my hand in the presence of the two subscribing witnesses.

CHRISTIAN HAMILTON GRAY.

Witnesses:
C. HEWETT,
WILMER M. HARRIS.